United States Patent
Mochizuki et al.

(10) Patent No.: US 10,457,167 B2
(45) Date of Patent: Oct. 29, 2019

(54) SEATBACK STRUCTURE HAVING PIVOTABLE UPPER SEATBACK SUPPORT

(71) Applicant: TS TECH CO., LTD., Saitama (JP)

(72) Inventors: Haruki Mochizuki, Tochigi (JP); Kazuhiro Mishiba, Utsunomiya (JP); Kazuya Miyawaki, Kuki (JP)

(73) Assignee: TS TECH CO., LTD., Saitama (JP)

( * ) Notice: Subject to any disclaimer, the term of this patent is extended or adjusted under 35 U.S.C. 154(b) by 94 days.

(21) Appl. No.: 15/890,401

(22) Filed: Feb. 7, 2018

(65) Prior Publication Data
US 2018/0222357 A1    Aug. 9, 2018

(30) Foreign Application Priority Data
Feb. 8, 2017   (JP) .................................. 2017-021244

(51) Int. Cl.
*B60N 2/22* (2006.01)
*B60N 2/68* (2006.01)

(52) U.S. Cl.
CPC ............. *B60N 2/2222* (2013.01); *B60N 2/22* (2013.01); *B60N 2/68* (2013.01); *B60N 2/682* (2013.01); *B60N 2205/30* (2013.01)

(58) Field of Classification Search
CPC . B60N 2/2222; B60N 2/0232; B60N 2205/30
See application file for complete search history.

(56) References Cited

U.S. PATENT DOCUMENTS

| | | | | |
|---|---|---|---|---|
| 7,845,729 B2* | 12/2010 | Yamada | ............... | B60N 2/0232 297/284.1 |
| 8,042,415 B2* | 10/2011 | Ito | .................. | B60N 2/0232 74/89.23 |
| 8,262,164 B2* | 9/2012 | Ito | .................. | B60N 2/0232 297/354.11 |
| 9,809,131 B2* | 11/2017 | Line | .................. | B60N 2/0232 |
| 2004/0195895 A1* | 10/2004 | Sedlatschek | ............. | A47C 7/38 297/408 |

(Continued)

FOREIGN PATENT DOCUMENTS

| | | |
|---|---|---|
| JP | 2010042748 | 2/2010 |
| JP | 2013023065 | 2/2013 |

OTHER PUBLICATIONS

European Search Report for EP18155359.5, dated Jul. 10, 2018, 7 pages.

*Primary Examiner* — Shin H Kim
(74) *Attorney, Agent, or Firm* — Dority & Manning, P.A.

(57) ABSTRACT

Provided is a seatback structure for a seatback provided with a lower seatback support and an upper seatback support pivotably connected to the upper end of the lower seatback support. An actuator (17) is fixedly secured to one of a pair lower side frames (6) of a seatback frame (F), and an output end (17*a*) of the actuator is configured to move linearly along a length of the lower side frame, and a link (25) is provided with an upper end pivotally connected to a part of a corresponding upper side frame (7) and a lower end pivotally connected to the output end of the actuator. The upper end portion of the lower side frame and the lower end portion of the corresponding upper side frame comprise plate members facing laterally each other in an overlying relationship, and at least partly interposing the link therebetween.

9 Claims, 7 Drawing Sheets

(56) References Cited

U.S. PATENT DOCUMENTS

| | | | |
|---|---|---|---|
| 2008/0252128 A1* | 10/2008 | Nishikawa | B60N 2/2222 297/354.11 |
| 2010/0102605 A1* | 4/2010 | Yamada | B60N 2/0232 297/284.3 |
| 2010/0244525 A1 | 9/2010 | Ito et al. | |
| 2012/0139317 A1 | 6/2012 | Fahl et al. | |
| 2018/0092465 A1* | 4/2018 | Seibold | A47C 7/462 |
| 2018/0222357 A1* | 8/2018 | Mochizuki | B60N 2/68 |
| 2018/0264976 A1* | 9/2018 | Novitsky | B60N 2/80 |

* cited by examiner

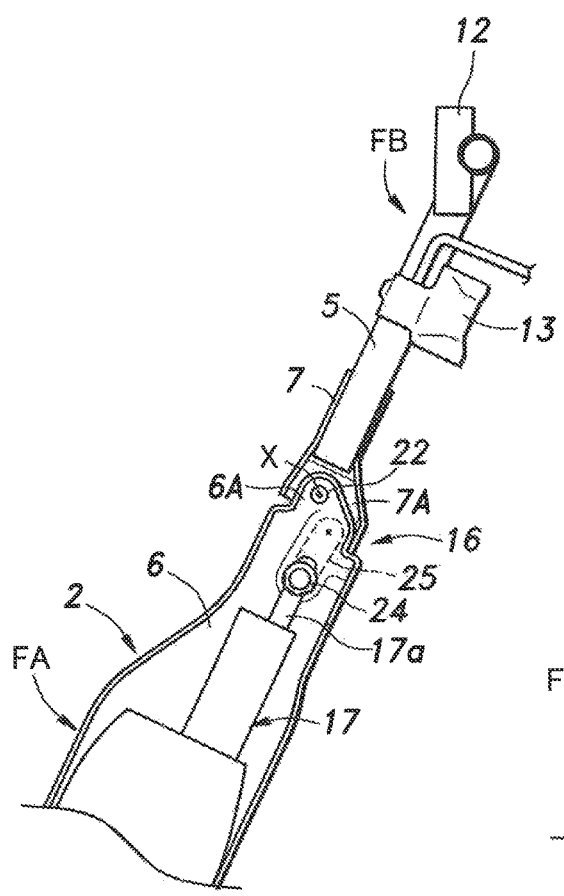
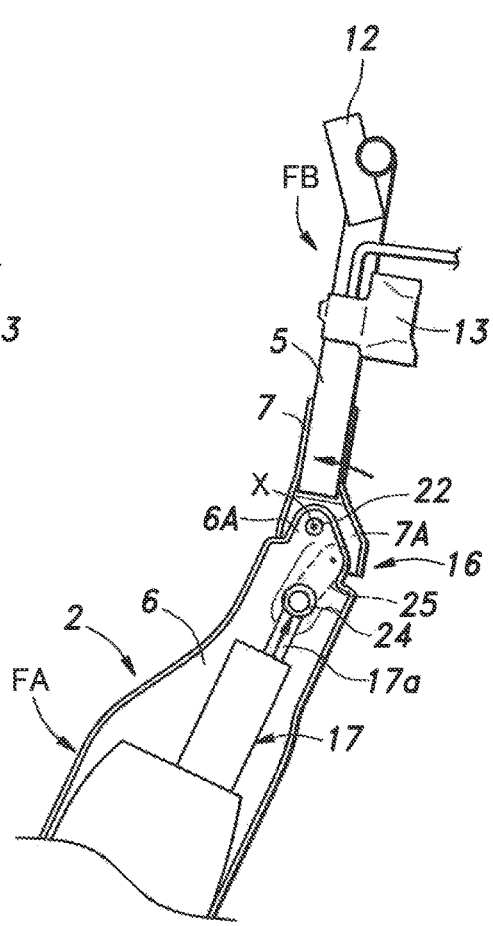

SEATBACK STRUCTURE HAVING PIVOTABLE UPPER SEATBACK SUPPORT

TECHNICAL FIELD

The present invention relates to a seatback structure for a vehicle seat provided with a pivotable upper seatback support.

BACKGROUND ART

A seatback structure for a vehicle seat provided with a pivotable upper seatback support is known. See JP2010-42748A and JP2013-23065A, for instance. Typically, the seatback includes a seatback lower support having a lower end attached to a rear end part of a seat cushion (typically via a reclining mechanism), and a seatback upper support having a lower end pivotally attached to an upper end of the seatback lower support. A drive mechanism is incorporated in the seatback for actuating the seatback upper support relative to the seatback lower support.

In the seatback structure disclosed in JP2010-42748A, a motor mount plate extends between a pair of side members of the lower seatback support to support an electric motor, and a nut and screw mechanism is provided in association with a pivot mechanism provided between the upper seatback support and the lower seatback support. A wire and pulley mechanism transmits the power of the electric motor to the nut and screw mechanism.

JP2013-23065A discloses a similar seatback structure. The power of an electric motor provided in the lower seatback support is transmitted to a nut and screw mechanism for tilting the upper seatback support relative to the lower seatback support via a torsional flexible cable.

As such a conventional seatback structure includes various component parts over a large area of the seatback, some care is required to avoid interference between moveable component parts of the drive mechanism with the pad of the seatback. Also, the drive mechanism including a transmission mechanism occupies a relative large space, and this complicates the seatback design.

SUMMARY OF THE INVENTION

In view of such problems of the prior art, a primary object of the present invention is to provide a seatback structure for a vehicle seat provided with a pivotable upper seatback support which can effectively prevent component parts for tilting the upper seatback support relative to the lower seatback support from interfering with surrounding members.

A second object of the present invention is to provide such a seatback structure provided with an actuator including a transmission mechanism which is compact in size.

To achieve such objects, the present invention provides a seatback structure for a vehicle seat, comprising: a pair of lower side frames (6) extending vertically; a pair of upper side frames (7) having lower end portions (7A) pivotally connected to upper end portions (6A) of the respective lower side frames around a laterally extending rotational center line (X); an upper frame (5) fixedly connected between upper ends of the upper side frames; at least one actuator (17) fixedly secured to one of the lower side frames and including an output end (17a) configured to move linearly along a length of the lower side frame; and a link (25) having an upper end pivotally connected to a part of the corresponding upper side frame and a lower end pivotally connected to the output end of the actuator; wherein the upper end portion of the one lower side frame and the lower end portion of the corresponding upper side frame comprise plate members facing laterally each other in an overlying relationship, and at least partly interposing the link therebetween.

The link is thus at least partly covered by the upper side frame and the lower side frame so that the link is protected from interfering with a surrounding member. Thereby, an unobstructed movement of the link is ensured.

Preferably, an upper end portion of the link is interposed between the upper end portion of the lower side frame and the lower end portion of the upper side frame.

Because the upper end portion of the link is covered by the upper end portion of the lower side frame and the lower end portion of the upper side frame, the link is protected from interfering with a surrounding member. Thereby, an unobstructed movement of the link is ensured.

According to a preferred embodiment of the present invention, an edge of the upper end portion of the lower side frame is bent away from the lower end portion of the upper side frame to form a lower flange (6E), the lower flange extending from a part in front of and below the rotational center line to a part behind and below the rotational center line past a part above the rotational center line.

Thereby, the stiffness of the upper end portion of the lower side frame is favorably enhanced.

Preferably, a front edge and a rear edge of the lower end portion of the upper side frame are bent toward the upper end portion of the lower side frame to define a pair of upper flanges (7B, 7C), each upper flange extending from a part below the rotational center line to a part above the rotational center line.

Thereby, the stiffness of the lower end portion of the upper side frame is favorably enhanced.

Preferably, the lower flange and the upper flanges extend in a laterally inward direction.

As the lower flange and the upper flanges extend in the same direction, the lateral dimension of the side frame consisting of the upper side frame and the lower side frame can be minimized.

According to another preferred embodiment of the present invention, a front edge and a rear edge of the lower end portion of the upper side frame are bent away from the upper end portion of the lower side frame to define a pair of upper flanges (7B', 7C'), each upper flange extending from a part below the rotational center line to a part above the rotational center line. Optionally, an upper flange lower part (7D') formed by bending a lower edge of the upper side frame away from the upper end portion of the lower side frame extends between the lower edges of the upper flanges.

Thereby, the stiffness of the lower end portion of the upper side frame is favorably enhanced.

Preferably, a part of the upper end portion of the lower side frame facing the lower end portion of the upper side frame is formed with a recess (6J) that at least partly receives the link.

By thus accommodating the link at least partly in the recess, the protrusion of the link from the outer profile of the lower side frame can be minimized or totally avoided, and the link is prevented from interfering with a surrounding member in a favorable manner.

Preferably, a lower end part of the recess is formed with a vertically elongated through hole (6K) receiving a pin (24) attached to a lower end part of the link, and the actuator is attached to a side of the lower side frame facing away from the link, another end of the pin being attached to the output end.

Thus, the actuator can be positioned between the opposing sections of the lower flange of the lower side frame so that the actuator and the link can be positioned without unduly protruding from the outer profile of the lower side frame.

Thus, the seatback structure of the present invention can be favorably applied to a seatback provided with a lower seatback support and an upper seatback support pivotably connected to the upper end of the lower seatback support.

BRIEF DESCRIPTION OF THE DRAWINGS

FIG. 6a is a simplified side view of the seatback frame in a rearward tilted position;

FIG. 6b is a simplified side view of the seatback frame in a forward tilted position.

DETAILED DESCRIPTION OF THE PREFERRED EMBODIMENT(S)

A seatback according to an embodiment of the present invention is described in the following with reference to the appended drawings. This seatback is provided with a lower seatback support and an upper seatback support pivotably connected to the upper end of the lower seatback support.

Figure 1:
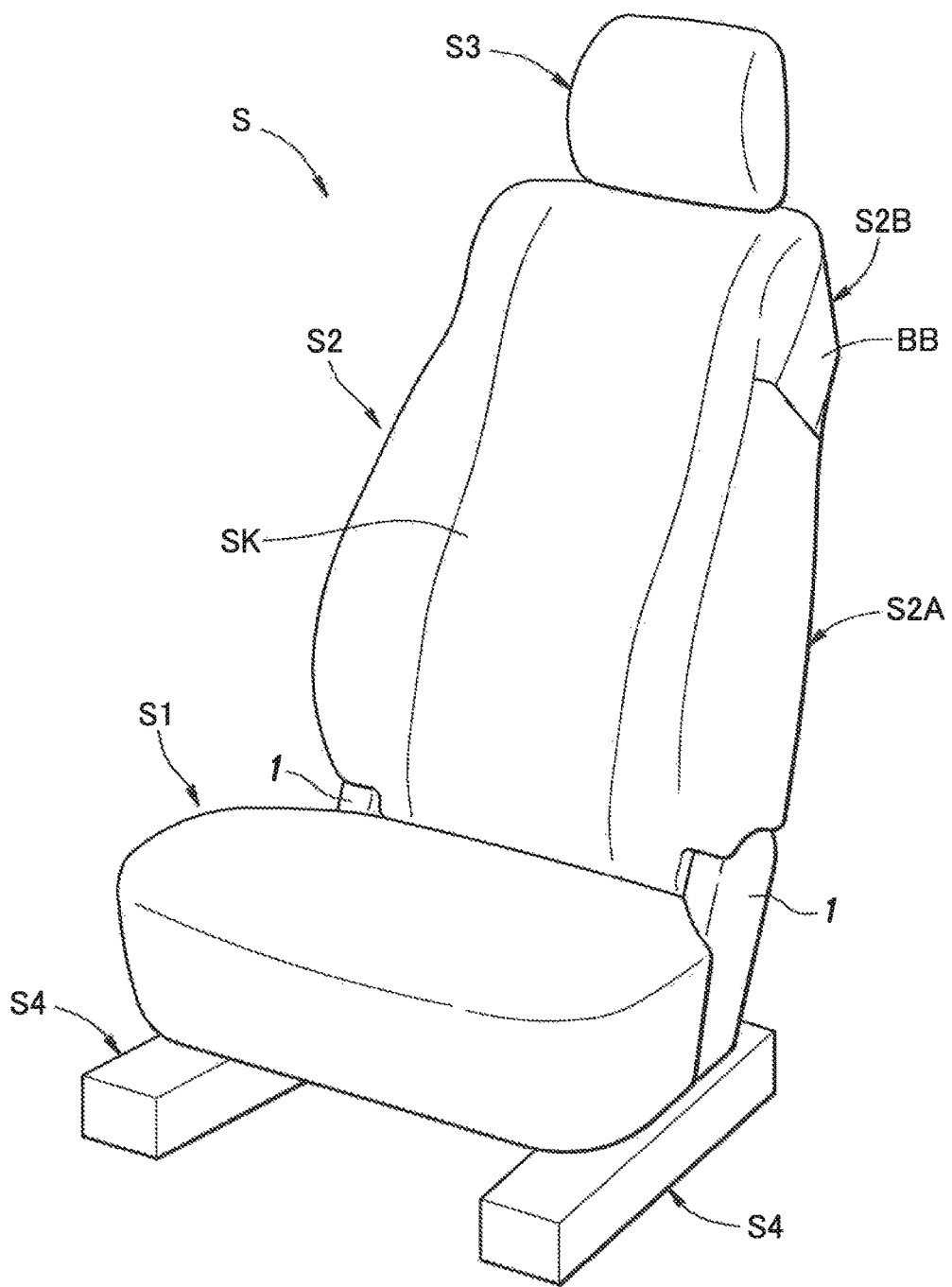
FIG. 1 is a front perspective view of a vehicle seat incorporated with a seatback structure according to an embodiment of the present invention.
Figure 2:
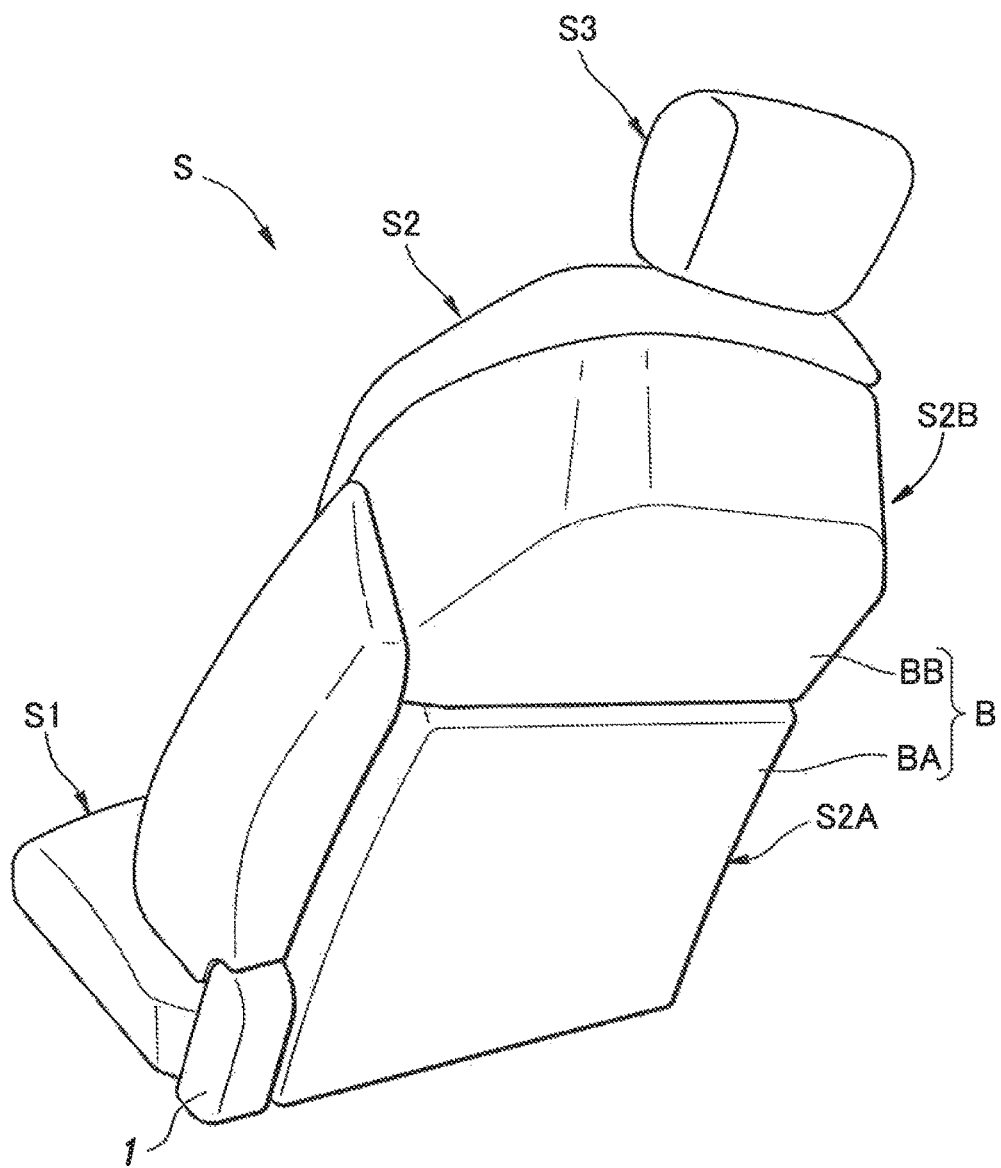
FIG. 2 is a rear perspective view of the vehicle seat.

As shown in FIGS. 1 and 2, a seat S for a vehicle includes a seat cushion S1 defining a seat surface, a seatback S2 defining a back rest surface, a headrest S3, and a slide rail system S4. The slide rail system S4 includes a pair of slide rails extending in the fore and aft direction on the floor of the vehicle, and supports the seat cushion S1 so as to be slidable in the fore and aft direction. The seatback S2 is connected to the seat cushion S1 via a reclining mechanism 1 so as to be rotatable (tiltable), and the headrest S3 is provided on the upper end of the seatback S2 so as to be vertically slidable.

The seat cushion S1 is formed by covering a seat cushion frame with a pad and a skin member. The front side and the lateral sides of the seatback S2 are formed by covering a seatback frame F (see FIG. 3) with a pad and a skin member SK, and the rear portion of the seatback S2 is formed by attaching a backboard B to the seatback frame F. The headrest S3 is formed by covering a head rest frame with a pad and a skin member. The pad may consist of resilient cushion material such as polyurethane foam, and the skin member SK may be formed of leather, synthetic leather, cloth or the like, and the backboard B may be made of synthetic resin or the like.

The seatback S2 includes a lower seatback support S2A connected to the seat cushion S1 via the reclining mechanism 1, and an upper seatback support S2B connected to the upper end of the lower seatback support S2A so as to be rotatable (tiltable) with respect to the lower seatback support S2A. The headrest S3 is provided on the upper end of the upper seatback support S2B. The backboard B includes a backboard lower part BA attached to the rear side of the lower seatback support S2A and a backboard upper part BB attached to the rear side of the upper seatback support S2B.

Although not shown in the drawings, the seat cushion frame includes a pair of left and right cushion side frames extending in the fore and aft direction on either side of the seat cushion frame, a front frame extending between the front ends of the cushion side frames, and a rear frame extending between the rear ends of the cushion side frames, so as to form a substantially rectangular frame structure. The slide rail system S4 is attached to the cushion side frames.

Figure 3:
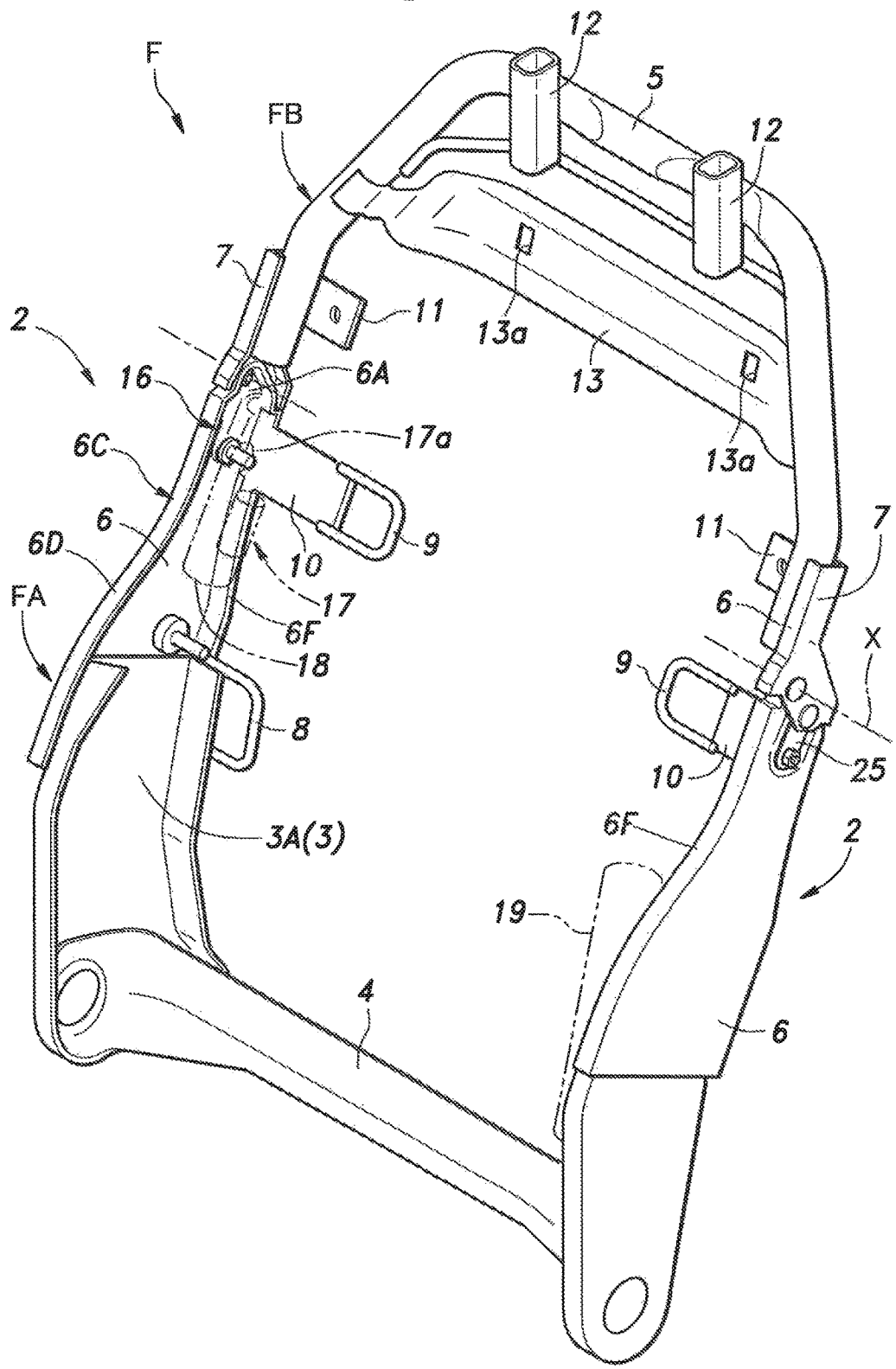
FIG. 3 is a perspective view of a seatback frame.

As shown in FIG. 3, the seatback frame F includes a pair of right and left side frames 2 extending substantially vertically on either side of the seatback frame F, a lower frame 4 extending laterally between lower portions of the side frames 2, and an inverted U-shaped upper frame 5 joined to the upper portions of the side frames 2 at respective ends thereof, so as to form a substantially rectangular frame structure.

Each side frame 2 is formed by three sheet metal members (plate members) arranged one above another in the vertical direction. The lower two sheet metal members are joined to each other by welding or the like to jointly form a lower side frame 6. The uppermost sheet metal member forms an upper side frame 7 which is connected to the upper end of the corresponding the lower side frame 6 so as to be rotatable around a rotational center line X extending in the lateral direction. The lower end of each lower side frame 6 is joined to the corresponding lower frame 4 by welding, for example, and the upper frame 5 is joined to the upper side frame 7 by welding, for example. The lower frame 4 and the lower side frames 6 jointly form a seatback frame lower part FA, and the upper side frames 7 and the upper frame 5 jointly form a seatback frame upper part FB.

Figure 4:
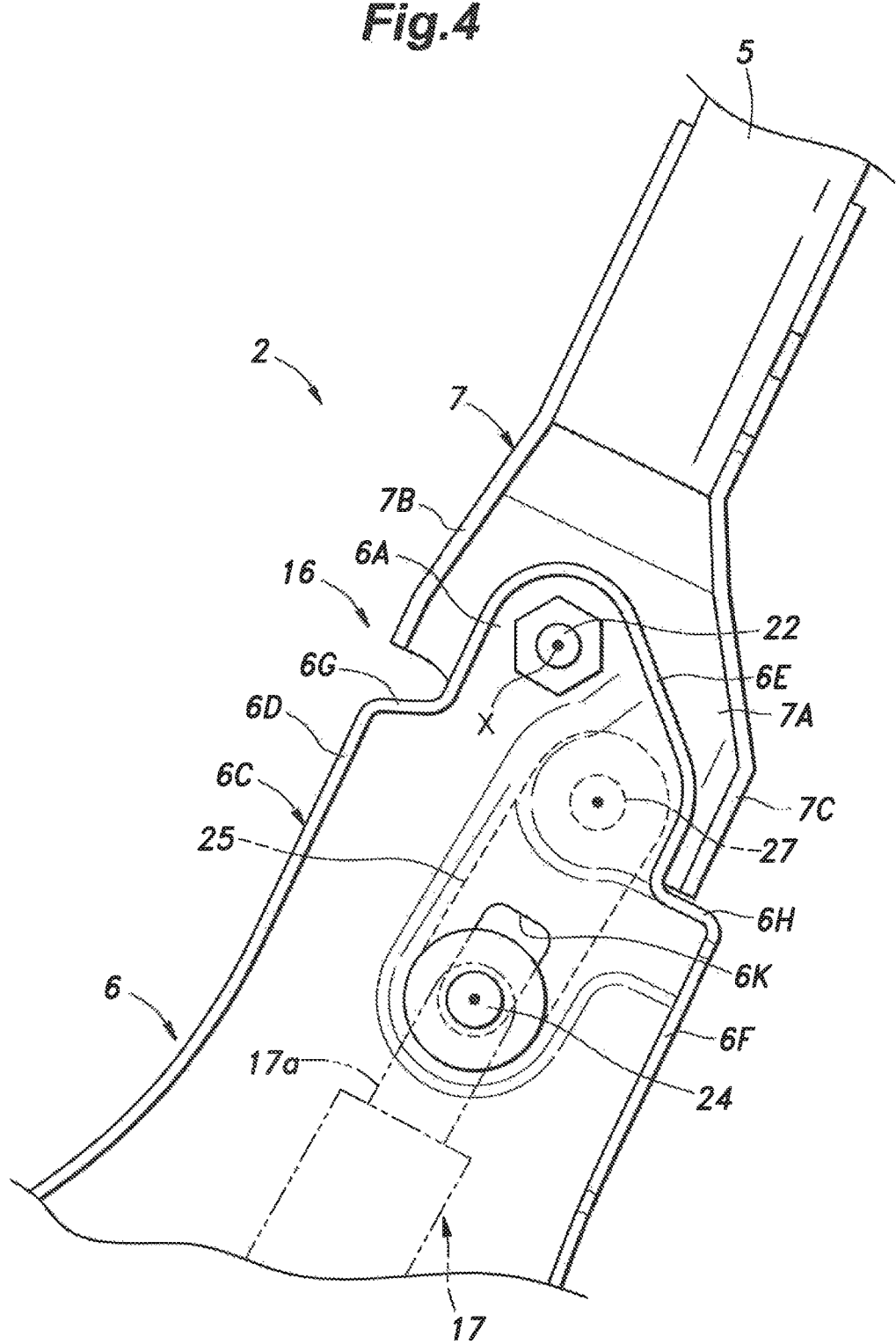
FIG. 4 is a fragmentary side view of a part of the seatback frame as seen from outside.

As shown in FIG. 4, the lower side frame 6 has a substantially smaller lateral dimension than the fore and aft dimension thereof, and thus has a major plane facing in the lateral direction. The lower side frame 6 narrows toward the upper end portion 6A thereof which is formed in a substantially semicircular shape when viewed from the lateral side. The front edge, the upper edge, and the rear edge of the lower side frame 6 are bent inward (with respect to the seat S) so as to form a lower side flange 6C. The lower side flange 6C thus includes a lower flange front part 6D extending along the front edge of the lower side frame 6, a lower flange upper part 6E extending along the edge of the upper end part of the lower side frame 6, and a lower flange rear part 6F extending along the rear edge of the lower side frame 6. The lower flange front part 6D and the lower flange upper part 6E are connected to each other by a front connecting wall 6G, and the lower flange rear part 6F and the lower flange upper part 6E are connected to each other by a rear connecting wall 6H. The lower flange front part 6D, the front connecting wall 6G, the lower flange upper part 6E, the rear connecting wall 6H, and the lower flange rear part 6F jointly form a continuous flange or a continuous wall. The lower flange upper part 6E extends substantially in a semicircular shape. The surfaces of the front connecting wall 6G and the rear connecting wall 6H face substantially vertically.

Figure 5:
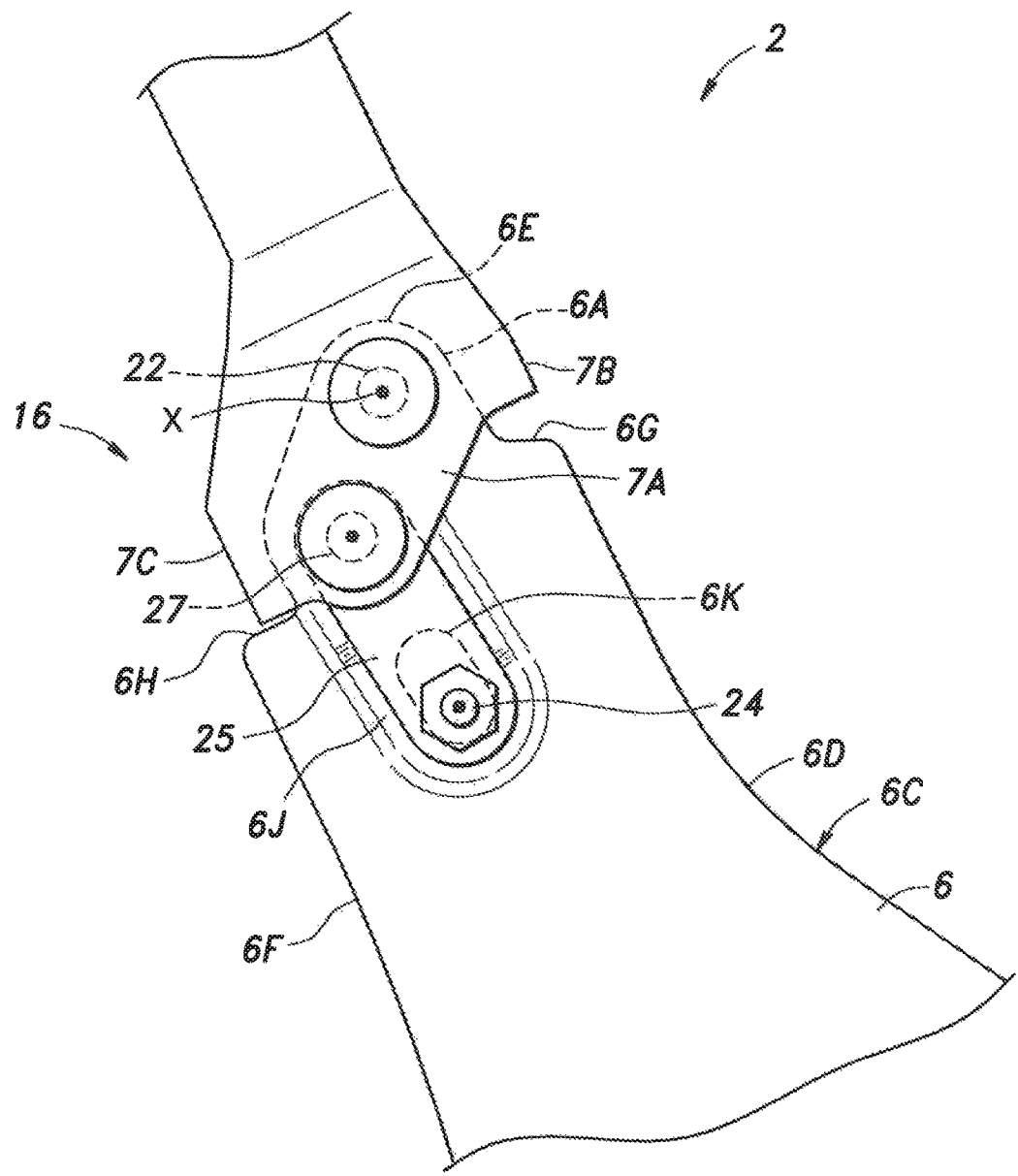
FIG. 5 is a fragmentary side view of a part of the seatback frame as seen from inside.
Figure 7:
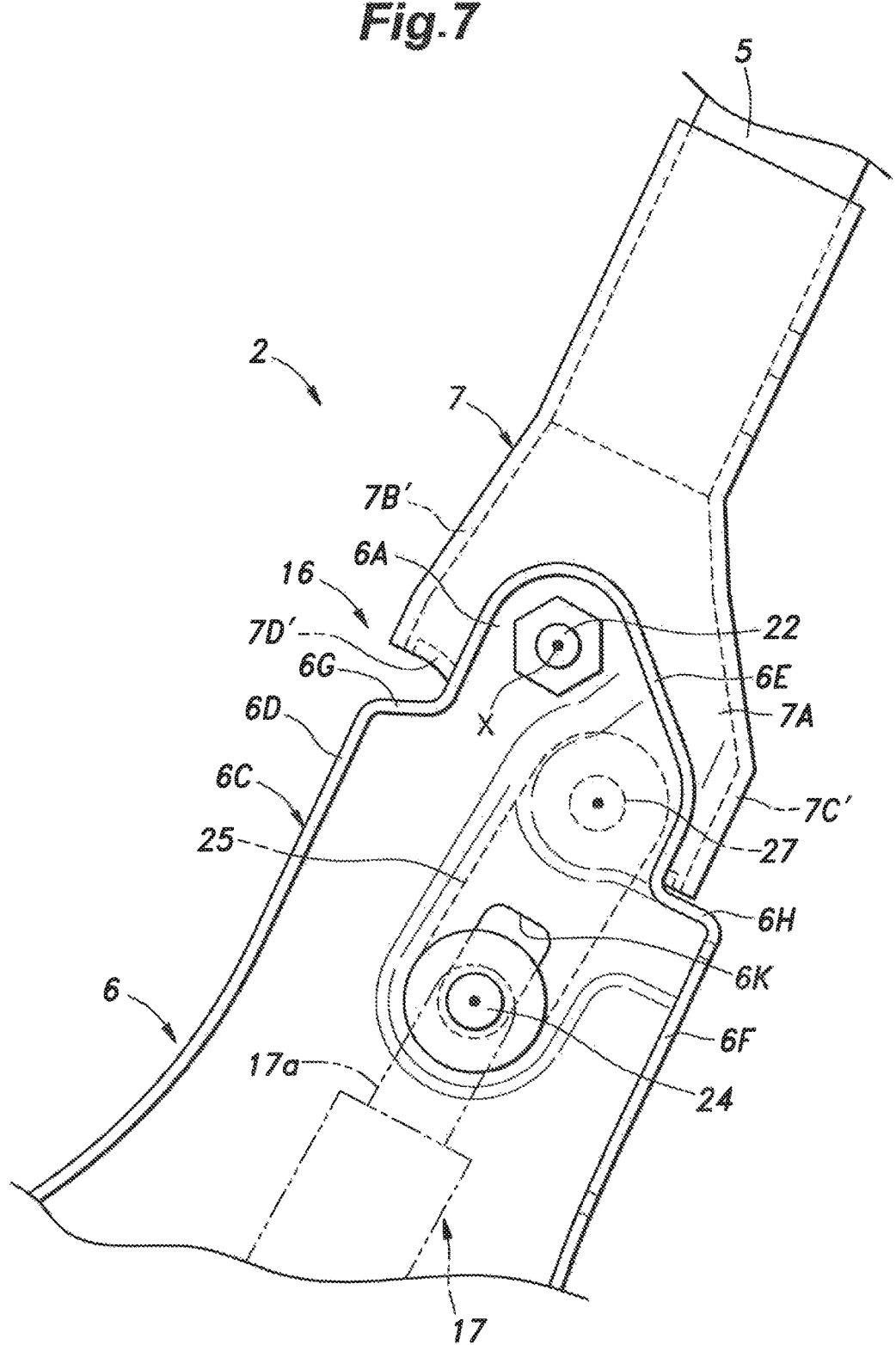
FIG. 7 is a view similar to FIG. 4 showing a modified embodiment of the present invention.

As shown in FIG. 5, a recess 6J which is recessed in the inward direction is formed on the outer side of an upper end part of the lower side frame 6. The recess 6J is elongated in the longitudinal (vertical) direction of the lower side frame 6, and extends to the upper edge of the upper end portion 6A of the lower side frame 6. A lower end part of the recess 6J is formed with a through hole 6K that is passed through the lower side frame 6. The through hole 6K is formed as a vertically elongated hole.

As shown in FIGS. 4 and 5, the upper side frame 7 has a major plane facing laterally, and extends vertically. The lower end portion 7A of the upper side frame 7 is overlaid on the upper end portion 6A of the lower side frame 6 from the outer side. The upper side frame 7 is provided with an upper flange front part 7B and an upper flange rear part 7C along the front edge and the rear edge of thereof, respectively, by bending the respective edge parts of the upper side frame 7 in the inward direction. The upper flange front part 7B is disposed in front of the lower flange upper part 6E, and the upper flange rear part 7C is disposed behind the lower flange upper part 6E. More specifically, the lower flange upper part 6E is disposed between the upper flange front part 7B and the upper flange rear part 7C in the fore and aft direction. The lower edge of the upper flange front part 7B faces the front connecting wall 6G with a gap defined therebetween, and the lower edge of the upper flange rear part 7C faces the rear connecting wall 6H with a gap defined therebetween.

The lower end portion 7A of the upper side frame 7 is rotatably coupled to the upper end portion 6A of the lower side frame 6 via a shaft member 22 extending laterally. The center of the shaft member 22 is the rotational center line X between the upper side frame 7 and the lower side frame 6. The lower flange upper part 6E partly surrounds the shaft member 22, and extends in the inward direction beyond the shaft member 22. More specifically, the lower flange upper part 6E extends from a point in front of and below the shaft member 22, passes above the shaft member 22, and extends to a point behind and below the shaft member 22. In the assembled state, the lower side flange 6C extends from the lower side frame 6 away from the side of the upper side frame 7, and the upper flange front part 7B extends from the upper side frame 7 toward the side of the lower side frame 6. The upper flange front part 7B extends vertically downward in front of the shaft member 22 to a point below the shaft member 22, and the upper flange rear part 7C extends vertically downward behind the shaft member 22 to a point below the shaft member 22. The lower end portion 7A of the upper side frame 7 is disposed at a position overlapping with an upper end part of the recess 6J.

As shown in FIG. 3, a first board mounting portion 8 consisting of a U-shaped steel bar is fixed to a vertically intermediate part of each lower side frame 6 at the two legs thereof so as to project inward from the corresponding lower flange rear part 6F. A lateral extension 10 in the form of a metal strip extends inward from an upper end part of each lower flange rear part 6F, and a second board mounting portion 9 consisting of a U-shaped steel bar is fixed to the free end of the lateral extension 10 at the two legs thereof. The first board mounting portions 8 and the second board mounting portions 9 are used for attaching the backboard lower part BA to the seatback frame lower part FA.

A third board mounting portion 11 in the form of a metal strip extends inward from an intermediate part of each upper flange rear part 7C. The third board mounting portions 11 are used for attaching the backboard upper part BB to the seatback frame upper part FB. A pair of headrest holding pipes 12 for supporting the headrest S3 are joined to a central part of the upper frame 5 in a mutually spaced apart relationship. A reinforcing frame 13 consisting of a plate member extends between a pair of pillar portions of the upper frame 5 extending in the generally vertical direction. The two ends of the reinforcing frame 13 are partly wrapped around the respective pillar portions of the upper frame 5 and are spot welded or otherwise fixedly attached thereto. The reinforcing frame 13 is formed with a pair of through holes 13a for securing the backboard upper part BB to the upper frame 5.

A power actuator 17 for tilting the right upper side frame 7 via a link mechanism 16 is attached to the inner surface of the right lower side frame 6. The actuator 17 includes an electric motor 18, a speed reduction mechanism connected to the output shaft of the electric motor 18, and a conversion mechanism such as a feed screw or a ball screw for converting the rotational motion of the speed reduction mechanism into a rectilinear motion of an output end 17a thereof. Various other per se known mechanisms can also be applied. The actuator 17 is fixed to the inner surface of the lower side frame 6 with threaded bolts or the like in such a manner that the output end 17a moves along the length of the lower side frame 6.

An air bag unit 19 for protecting the occupant's side at the time of a vehicle crash is attached to a lower part of the inner side of the left lower side frame 6.

FIG. 4 shows the inner surface of the right side frame 2, and FIG. 5 shows the outer surface of the right side frame 2, in a rearward inclined position where the upper side frame 7 aligns with the lower side frame 6 along a straight line in side view.

As shown in FIG. 5, the recess 6J receives a link 25 consisting of a sheet metal member and extending in the longitudinal direction of the recess 6J substantially in parallel to the lower side frame 6. The lower end of the link 25 is provided with a first pin 24 which is passed through the through hole 6K, and connected to the output end 17a.

The upper end of the link 25 is disposed between the lower side frame 6 and the upper side frame 7, and is pivotally coupled to the upper side frame 7 via a second pin 27. The second pin 27 is positioned behind and below the shaft member 22.

The mode of movement of the upper side frames 7 is described in the following. Since the upper side frames 7 are mirror images of each other, and are essentially identical in structure and function, only one of the upper side frames 7 is described in the following. FIG. 6a shows the upper side frame 7 in the rearward tilted position which is defined by the abutting of the first pin 24 onto the lower edge of the through hole 6K, and FIG. 6b shows the upper side frame 7 in a most forward tilted position which is defined by the abutting of the first pin 24 onto the upper edge of the through hole 6K.

When the output end 17a of the actuator 17 is extended, the first pin 24 moves upward in the through hole 6K along the lower side frame 6. This causes the link 25 to push upward the second pin 27 located behind the rotational center line X of the upper side frame 7 so that the upper side frame 7 tilts forward.

When the output end 17a of the actuator 17 is retracted, the first pin 24 moves downward in the through hole 6K along the lower side frame 6. This causes the link 25 to pull downward the second pin 27 located behind the rotational center line X of the upper side frame 7 so that the upper side frame 7 tilts rearward (toward the upright position).

In the illustrated embodiment, the actuator 17 fixedly attached to the lower side frame 6 is provided with the output end 17a that is configured to move linearly along the lower side frame 6. The actuator 17 tilts the seatback frame upper part FB in the forward or rearward direction via the link mechanism 16 including the link 25 connected between a part of the upper side frame 7 located behind the rotational center line X via the second pin 27 and the output end 17a of the actuator 17 via the first pin 24. Therefore, the seatback S2 can be provided with a relatively small thickness (fore and aft dimension), and the actuator 17 can be attached to the lower side frame 6 in a stable manner with a minimum number of component parts.

In the illustrated embodiment, the upper end part of the link 25 is covered between the upper end portion 6A of the lower side frame 6 and the lower end portion 7A of the upper side frame 7 so that the link 25 is prevented from touching the surrounding objects. Furthermore, because the link 25 is received in the recess 6J, and prevented from protruding from the lower side frame 6 (or at least the protrusion of the link 25 from the outer profile of the lower side frame 6 is minimized), the link 25 is favorably prevented from interfering with the surrounding objects.

The upper end portion 6A of the lower side frame 6 is provided with the lower side flange 6C (the lower flange upper part 6E) in a continuous manner so that the stiffness of the lower side frame 6 is improved. The lower end portion 7A of the upper side frame 7 is provided with the upper flange front part 7B and the upper flange rear part 7C along the front edge and the rear edge of thereof, respectively, so that the stiffness of the upper side frame 7 is improved. Because of the presence of the lower flange upper part 6E between the upper flange front part 7B and the upper flange rear part 7C, the stiffness of the junction between the lower side frame 6 and the upper side frame 7 is improved.

The lower side frame 6 is provided with the through hole 6K elongated in the lengthwise direction of the lower side frame 6 to guide the output end 17a of the actuator 17 via the first pin 24 so that a play in the output end 17a of the actuator 17 is minimized, and the tilting of the upper seatback support S2B can be performed in a smooth manner.

The output end 17a of the actuator 17 is connected to the link 25 via the first pin 24 passed laterally through the through hole 6K so that the through hole 6K guides the output end 17a via the first pin 24. Therefore, the number of component parts for this guide structure can be minimized.

Because the output end 17a of the actuator 17 is positioned in front of the lateral extension 10 so that the output end 17a of the actuator 17 is covered by the lateral extension 10 from behind. Therefore, the output end 17a is prevented from being interfered by a surrounding member of the seatback S2.

As shown in FIG. 3, the actuator 17 for tiling the upper seatback support S2B is positioned on the inner side of one of the lower side frames 6 so that the available space can be efficiently utilized for accommodating the actuator 17 including the motor 15 and the thickness (fore and aft direction) of the seatback S2 is not required to be increased.

The air bag unit 19 is positioned on the inner side of the other lower side frame 6 so that the available space can be efficiently utilized for accommodating the air bag unit 19, and the thickness (fore and aft direction) of the seatback S2 is not required to be increased.

Although the present invention has been described in terms of a preferred embodiment thereof, it is obvious to a person skilled in the art that various alterations and modifications are possible without departing from the scope of the present invention. For instance, the seatback structure of the present invention is applicable not only to motor vehicles but also to railway trains, aircraft and watercraft. The seatback structure of the present invention may also be applied to chairs and sofas for offices and homes.

The configurations of the lower side flange 6C, the upper flange front part 7B and the upper flange rear part 7C can be modified without departing from the spirit of the present invention. For instance, as shown in Figure the upper flange front part 7B' and the upper flange rear part 7C' may be directed outward (away from the lower side frame 6). In this case, the lower ends of the upper flange front part 7B' and the upper flange rear part 7C' may be connected to each other by an upper flange lower part 7D' formed by bending the lower edge of the upper side frame 7 in the outward direction (or away from the lower side frame 6) and extending under the rotational center line X, possible with small breaks. In other words, the upper flange lower part (7D') extends between the lower edges of the upper flange front part 7B' and the upper flange rear part 7C.

The invention claimed is:

1. A seatback structure for a vehicle seat, comprising:
a pair of lower side frames extending vertically;
a pair of upper side frames having lower end portions pivotally connected to upper end portions of the respective lower side frames around a laterally extending rotational center line;
an upper frame fixedly connected between upper ends of the upper side frames;
at least one actuator fixedly secured to one of the lower side frames and including an output end configured to move linearly along a length of the lower side frame; and
a link having an upper end pivotally connected to a part of the corresponding upper side frame and a lower end pivotally connected to the output end of the actuator;
wherein the upper end portion of the one lower side frame and the lower end portion of the corresponding upper side frame comprise plate members facing laterally each other in an overlying relationship, and at least partly interposing the link therebetween.

2. The seatback structure according to claim 1, wherein an upper end portion of the link is interposed between the upper end portion of the lower side frame and the lower end portion of the upper side frame.

3. The seatback structure according to claim 2, wherein an edge of the upper end portion of the lower side frame is bent away from the lower end portion of the upper side frame to form a lower flange, the lower flange extending from a part in front of and below the rotational center line to a part behind and below the rotational center line past a part above the rotational center line.

4. The seatback structure according to claim 3, wherein a front edge and a rear edge of the lower end portion of the upper side frame are bent toward the upper end portion of the lower side frame to define a pair of upper flanges, each upper flange extending from a part below the rotational center line to a part above the rotational center line.

5. The seatback structure according to claim 4, wherein the lower flange and the upper flanges extend in a laterally inward direction.

6. The seatback structure according to claim 2, wherein a front edge and a rear edge of the lower end portion of the upper side frame are bent away from the upper end portion of the lower side frame to define a pair of upper flanges, each upper flange extending from a part below the rotational center line to a part above the rotational center line.

7. The seatback structure according to claim 6, wherein an upper flange lower part formed by bending a lower edge of the upper side frame away from the upper end portion of the lower side frame extend between the lower edges of the upper flanges.

8. The seatback structure according to claim 1, wherein a part of the upper end portion of the lower side frame facing the lower end portion of the upper side frame is formed with a recess that at least partly receives the link.

9. The seatback structure according to claim 8, wherein a lower end part of the recess is formed with a vertically elongated through hole receiving a pin attached to a lower end part of the link, and the actuator is attached to a side of the lower side frame facing away from the link, another end of the pin being attached to the output end.

\* \* \* \* \*